United States Patent [19]

Minnick

[11] Patent Number: 5,043,368

[45] Date of Patent: Aug. 27, 1991

[54] POLYETHERIMIDE/EPOXY CHOPPED FIBER REINFORCED LAMINATES AND THE PREPARATION THEREOF

[75] Inventor: Michael G. Minnick, Coshocton, Ohio

[73] Assignee: General Electric Company, Worthington, Ohio

[21] Appl. No.: 635,017

[22] Filed: Dec. 28, 1990

[51] Int. Cl.⁵ .......................... C08K 3/40; C08L 63/02
[52] U.S. Cl. ..................... 523/444; 523/466; 523/468; 524/464; 524/494
[58] Field of Search ............. 523/428, 429, 439, 440, 523/444, 466, 468; 524/464, 494

[56] References Cited

U.S. PATENT DOCUMENTS

| | | | |
|---|---|---|---|
| 4,557,860 | 12/1985 | DiSalvo et al. | 523/400 |
| 4,794,148 | 12/1988 | Nakamura et al. | 525/530 |
| 4,994,536 | 2/1991 | Arpin | 526/262 |
| 4,996,285 | 2/1991 | Arpin | 528/117 |

Primary Examiner—Paul R. Michl
Assistant Examiner—Peter Szekely
Attorney, Agent, or Firm—Mueller and Smith

[57] ABSTRACT

The present invention is directed to a method for making a chopped fiber-reinforced composite. The method comprises dispersing a polyamide acid/epoxy blend and greater than 50 wt-% chopped fiber in an aerated surfactant foam. The foam is deposited on a foraminous layer and collapsed to form a web. The web is consolidated at a temperature of greater than about 280° C. and a pressure of greater than about 500 psi. The resulting composite typically has a flexural modulus of greater than 2,000 ksi and flexural strength values of greater than about 30,000 psi and typically between about 30,000 and 50,000 psi. The composite should find use in applications requiring effective high mechanical stiffness and strength, and flame resistance.

8 Claims, No Drawings

POLYETHERIMIDE/EPOXY CHOPPED FIBER REINFORCED LAMINATES AND THE PREPARATION THEREOF

BACKGROUND OF THE INVENTION

The present invention relates to the production of reinforced laminates such as used in circuit board manufacture and more particularly to the use of a polyetherimide/epoxy therefor.

Metal-clad boards, particularly such boards for use in fabricating printed circuits, are well known in the art. The simplest of such boards generally comprises a resinous plastic substrate to which is bonded at least one thin sheet of an electrically conductive material, preferably copper. The resinous plastic substrate can be clad with the metal foil on one or both sides, depending upon the desired use, and can be rigid or flexible depending upon the composition of the resinous plastic substrate, the choice of reinforcement (if any), and the use to which the board is to be put.

In preparing rigid metal-clad boards, it is common to form individual lamina, commonly called prepregs, by formulating a resinous binder composition made from epoxy, modified styrene, or the like. A solvent solution of the resin is placed in an apparatus known as a "dip tank". Continuous webs of reinforcement can be preimpregnated in the tank and then dried in a vertical or horizontal treating tower or oven. Normally, the resin is partially cured or B-staged after exiting the treater tower or oven. The copper foil, optionally coated with an adhesive, is placed on one side of the prepreg and subjected to heating under pressure to effect a bond between the metal foil and the substrate. Multiple prepregs can be used in forming a single composite board. Additionally, multilayer printed wiring boards will have a number of interposed laminae and copper sheets.

Pressing of the boards can be effected in a press by placing the foil/substrate structure between the platens and closing the press, or a continuous belt can be used. The curing cycle in the press will depend upon nature and thickness of the laminate, the time and temperature of the cycle being those required to cure the substrate and the bonding adhesive layer, if present. Sufficient pressure is required to effect adequate flow of the adhesive and/or substrate resins in order to wet-out and bond adequately. The pressure must be sufficient to prevent blistering which is due to the release of gases resulting either from retained volatiles in the substrate or adhesive layers, or resulting from by-products of the curing process.

Heretofore, poyetherimide sheets have been proposed as substrates to which copper can be clad in the formation of printed circuit boards. Reinforced composite structures also have been made utilizing polyetherimide resins. U.S. Pat. No. 4,297,385 shows the use of polyetherimide resins. U.S. Pat. No. 4,118,535 shows the use of a polyetheramide acid for coating metals. U.S. Pat. No. 4,118,535 shows the use of a polyetheramide acid plus an epoxy for forming coatings for metals. U.S. Pat. No. 3,682,960 shows the use of poly bis(4-aminophenyl) ether pyromellitamide plus a copolymer of trimellitic anhydride and methylene dianiline for forming coatings for metals. U.S. Pat. No. 4,562,119 shows a siloxane-modified polyamide, polyimide, or polyamide-imide curable coating for metals.

BROAD STATEMENT OF THE INVENTION

The present invention is directed to a method for making a chopped fiber-reinforced composite. The method comprises dispersing a polyamide acid/epoxy blend and greater than 50 wt-% chopped fiber in an aerated surfactant foam. The foam is deposited on a foraminous layer and collapsed to form a web. The web is consolidated at a temperature of greater than about 280° C. and a pressure of greater than about 500 psi. The resulting composite typically has a flexural modulus of greater than 2,000 ksi and flexural strength values of greater than about 30,000 psi and typically between about 30,000 and 50,000 psi. The composite should find use in applications requiring effective high mechanical stiffness and strength, and flame resistance.

Advantages of the present invention include the ability to retain flame resistance of a flame-resistant polyetherimide resin, yet reduce the temperature and/or pressure requirements to achieve glass wet out and flow by dint of the epoxy modification. Another advantage is the ability to achieve high flexural modulus and flexural strength values for composites containing greater than 50% chopped fiber. These and other advantages will be readily apparent to those skilled in the art based upon the disclosure contained herein.

DETAILED DESCRIPTION OF THE INVENTION

Referring initially to the polyamide acid component of the blend, it will be appreciated that such polyamide acid component can be converted into polyetherimides by reacting an organic diamine with an aromatic bis(ether dicarbonyl), i.e. an aromatic bis(ether anhydride) or an aromatic bis(ether dicarboxylic acid). Such polyetherimides are shown, for example, in U.S. Pat. Nos. 3,803,805, 3,787,364, 3,917,643, and 3,847,867. As the present invention functions with a precursor for such polyetherimides, reference is made to U.S. Pat. No. 4,835,249 and application Ser. No. 489,146, filed Mar. 5, 1990, which teach the synthesis of the polyamide acid component used in the present invention. As disclosed in the former, such polyamide acids are prepared by reacting an aromatic dianhydride of the formula:

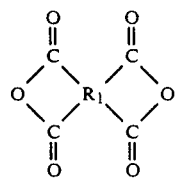 (I)

with at least one organic diamine having the formula

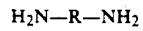

$H_2N-R-NH_2$ (II)

in a high-boiling, aprotic organic solvent under polyamide acid-forming conditions; heating the reaction solution under imidization conditions for a time sufficient to effect substantially complete reaction of the aromatic dianhydride and the organic diamine to form an insoluble polyimide prepolymer (i.e. polyamide acid) and to effect substantially complete distillation of the water of reaction out of the reaction solution, and separating the insoluble polyamide acid from the reaction solution by solid-liquid separation techniques. The various specific aromatic dianhydrides and diamines can be found in the '249 patent, the disclosure of which is expressly incorporated herein by reference.

In the copending, commonly-assigned application cited above, the polyamide acid is synthesized by the reaction of a tetracarboxylic acid dianhydride with a diamine. Suitable diamines, especially m- and p-phenylenediamine, and amino-terminated polydiorganosiloxanes, such as, for example, 1,9-diamino-4,4,6,6-tetramethyl-4,6-disala-5-oxanonane. Other diamines which may be employed include those disclosed, for example, in U.S. Pat. No. 4,448,937. Suitable dianhydrides include, for example, pyromellitic dianhydride, 3,3',4,4'-tetracorboxybenzophenone dianhydride, 3,4-dicarboxyphenyl ether dianhydride, and, preferable, dianhydrides of the formula:

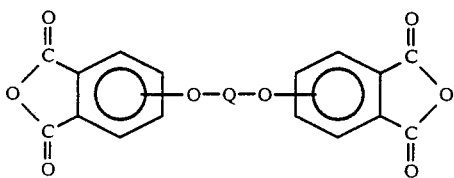

wherein Q is defined in said copending application, the disclosure of which is expressly incorporated herein by reference.

The aromatic dianhydride and the organic diamine can be reacted in accordance with the reaction conditions, including solvenet, as disclosed in the references cited above.

With respect to the epoxy component of the polyamide acid/epoxy blend, reference is made to U.S. Pat. No. 4,118,535 which proposes a variety of epoxy resins useful for blending with polyetheramide-imide resins. Of particular note is the description commencing at column 5, line 25, bridging column 7, line 18.

A particular class of useful epoxy components optionally can be brominated to provide flame retardancy to the inventive composite. The most common compounds of this type are prepared by the reaction of bisphenols with epichlorohydrin. (By "bisphenol" as used herein is meant a compound containing two hydroxyphenyl groups attached to an aliphatic or cycloaliphatic moiety, which may also contain aromatic substituents.) Said compounds may be represented by the formula:

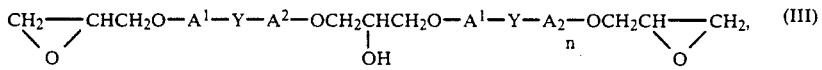

wherein n has an average value up to 1, each of $A^1$ and $A^2$ is a monocyclic divalent aromatic radical and Y is a bridging radical in which one or two atoms separate $A^1$ from $A^2$. The O—$A^1$ and $A^2$—O bonds in formula I are usually in the meta or para positions of $A^1$ and $A^2$ in relation to Y.

In the formula III, the $A^1$ and $A^2$ values may be unsubstituted phenylene or substituted derivatives thereof, illustrative substituents (one or more) being alkyl, nitro, alkoxy and the like. Unsubstituted phenylene radicals are preferred. Each of $A^1$ and $A^2$ may, for example, be o- or m-phenylene and the other p-phenylene, but both preferably are p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, ethylene, isopropylidene, neopentylidene, cyclohexylidene, or cyclopentadecylidene, especially a gem-alkylene (alkylidene) radical and most preferably isopropylidene. Also included, however, are radicals which contain atoms other than carbon and hydrogen; for example, carbonyl, oxy, thio, sulfoxy, and sulfone.

The materials which are preferred are commercially available reaction products of epichlorohydrin and 2,2-bis(4-hydroxyphenyl)propane (bisphenol A), including EPON 825 (n=0) and EPON 828 (n=about 0.14), available from Shell Chemical Co.

Another epoxy component is at least one bisphenol containing bromine in the form of substituents of the aromatic rings, usually a brominated derivative of bisphenol A. Its purpose according to the invention is principally to provide flame retardancy. 2,2-bis(3,5-dibromo-4-hydroxyphenyl)propane is preferred as this reagent because of its availability, relatively low cost and particular suitability for the purposes of the invention.

Mixtures of such ethers, part of the components of said mixture being halogen-free and the balance thereof containing bromine as aryl substituents, also can be used. The total amount of bromine therein is about 10%-60% by weight.

Compounds of this type are prepared conventionally by the reaction of bisphenols with epichlorohydrin. (By "bisphenol" as used herein is meant a compound containing two hydroxyphenyl groups attached to an aliphatic or cycloaliphatic moiety, such may also contain aromatic substituents.) Said compounds may be represented by the formula:

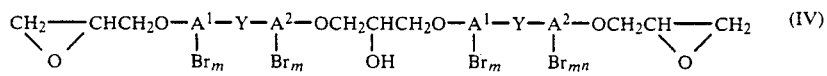

wherein m is 0-4, n has an average vaue up to 1, each of $A^1$ and $A^2$ is a monocyclic divalent aromatic radical, and Y is a bridging radical in which one or two atoms separate $A^1$ from $A^2$. The O—$A^1$ and $A^2$—O bonds in formula IV are usually in the meta or para positions of $A^1$ and $A_2$ in relation to Y.

In formula IV, the $A^1$ and $A^2$ values may be unsubstituted phenylene or substituted derivatives thereof, illustrative substituents (one or more) being alkyl nitro, alkoxy and the like. Unsubstituted phenylene radicals are preferred. Each of $A^1$ and $A^2$ may, for example, be o- or m-phenylene and the other p-phenylene, but both are preferably p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, ethylene, isopropylidene, neoptenylidene, cyclohexylidene, or cyclopentadecylidene, especially a gem-alkylene (alkylidene) radical and most preferably isopropylidene.

Also included, however, are radicals which contain atoms other than carbon and hydrogen; for example, carbonyl, oxy, thio, sulfoxy, and sulfone.

The polyamide acid/epoxy blend may be a physical blend or the components can be reacted prior to combining with the chopped fiber. In such cases, catalysts effective as a curing agent for epoxy resins, e.g. imidazoles and arylene polyamines, can be used.

Particularly useful imidazoles are imidazole, 1-methylimidazole, 1,2-dimethylimidazole, 2-methylimidazole, 2-heptadecylimidazole, 2-ethyl-4-methylimidazole, 2-undecylimidazole, and 1-(2-cyanoethyl)-2-phenylimidazole. Representative useful arylene polyamines include, for example, diethyltoluenediamine, tris(dimethylaminomethyl)phenol, and 3-phenyl-1,1-dimethyl urea. Commercially available imidazole-arylene polyamine mixtures can be used; the especially preferred mixtures contain arylene polyamines with a high degree of alkyl substitution on the aromatic ring, typically at least three such substituents. The diethyl-methyl-substituted m- and p-phenylenediamines are generally the most preferred polyamines.

Unexpectedly, silane coupling agents added to improve wetting out of the fabric reinforcement displayed effective catalytic behavior in the curable formulation. Silanes evaluated include 3-(2-aminoethyl)-aminopropyl trimethoxysilane, gamma-aminopropyl triethoxysilane, and glycidoxypropyl trimethoxysilane. The amine-containing silanes proved more effective. Silanes can be used as co-catalysts or can be the primary catalyst.

With respect to the chopped fiber, the length of such fiber generally ranges from between about ⅛ and ¾ inches in length. Greater than 50 wt-% chopped fiber by weight of the fiber-reinforced blend is used. Conventional reinforcing fiber includes, for example, E glass, S glass, quartz fiber, Nextel brand inorganic fiber, organic fiber (e.g. Kevlar brand fiber or Nomex brand fiber), and aluminum oxide or other ceramic fiber. Further on conventional fibers can be found in *Handbook of Fillers and Reinforcements for Plastics*, edited by Katz and Milewski, Van Rostrand Reinholt Company, Litton Educational Publishing, Inc. (1978).

With respect to the aerated surfactant foam generation and collapsing, reference is made to U.S. Pat. No. 3,716,449 that discloses the basic Wiggins Teape process which is used in accordance with the present invention. Essentially, the Wiggins Teape process utilizes conventional paper making activities in the preparation of reinforced polymeric composites.

Once the foam has been collapsed to provide the uncured mat, the mat is subjected to high pressure (greater than 500 psi) in order to fully consolidate the chopped fiber composite and eliminate voids at temperatures of between about 280° and 310° C. High temperatures (greater than 280° C.) are required in order to melt the polyamide acid component of the blend and to permit the polyamide acid and epoxy to react assuming a physical blend was established initially. The high temperature, high pressure consolidation of such composites is well known in the art and little more need be detailed here.

The following examples show how the present invention has been practiced, but should not be construed as limiting. In this application, all percentages and proportions are by weight and all units are in the metric system, unless otherwise expressly indicated. Also, all citations are expressly incorporated herein by reference.

EXAMPLES

Example 1

Mats were prepared using the Wiggins Teape methodology described above, using the compositions set forth in the table below. This methodology consisted of dispersing a 110 g charge of the powdered resin/glass fiber composition in an aqueous foam (0.14% Triton X100 aqueous solution) with a Denver mixer and vacuum filtering through a 160 mesh screen. The mats then were dried at 100° C. for 1-2 hours and prepared for lamination by varying the ply lay-up as follows. For laminates 1 and 2, the 45% glass mat formed the outside plies and the 55% glass mats formed the inner plies. For laminates 3 and 4, the sequencing of plies was reversed. A 2 mil thick film of Ultem D5001 polyetherimide (DL4151, GE Plastics Structured Products Division, Mt. Vernon, Indiana) were added as outside skin layers to wet-out the surface fibers. The mats then were pressed at ca 290° C., 1,000 psi, for 30 minutes between release liners and cooled under pressure. The compositions evaluated and results recorded are set forth below.

TABLE 1

| | Laminate No. (wt- %) | | | |
|---|---|---|---|---|
| | 1 | 2 | 3 | 4 |
| Resin Composition* | | | | |
| D5001 Polyamide Acid | 75 | 75 | 75 | 75 |
| S6819 Br Epoxy Upstage* | — | 25 | — | 25 |
| ECN 1299 | 25 | — | 25 | — |
| % glass** outer plies | 45 | 45 | 55 | 55 |
| % glass inner plies | 55 | 55 | 45 | 45 |
| .002" ULTEM D4151 Cap layer | no | no | yes | yes |
| Lower phase transition °C. | 116.7 | — | 99.9 | — |
| Upper phase transition, °C. | 181.9 | 150.6 | 192.1 | 172.6 |
| Flexural Properties (ASTM D790) | | | | |
| Flexual Modulus, MMpsi | | | | |
| Length | 2.30 | 2.51 | 2.70 | 2.33 |
| Cross | 2.05 | 2.36 | 2.09 | 2.17 |
| Flexural Strength, Mpsi | | | | |
| Length | 34.6 | 34.8 | 52.5 | 40.7 |
| Cross | 33.7 | 32.8 | 34.8 | 30.9 |

*D5001 polyamide acid, GE Plastics, Mt. Vernon, Ill.
S6819 epoxy is the reaction product of EPON 828 diglycidyl ether of bisphenol A (epoxide equivalent weight 185-195, Shell Chemical Co.) and tetrabromobisphenol A (3.5:1.0 molar ratio), reaction initiated at 120° C. using tiphenylphosphine catalyst, toluene solvent, supplied at 75% solids
ECN 1299 is Araldite ECN 1299 epoxy cresol novolac, Ciba Geigy Corp., Hawthorne, N.Y.
**PPG 2811 chopped glass fiber, 0.5 in., PPG Industries, Pittsburgh, Pa.

The above-tabulated results indicate that mechanical properties exceeded the 2,000,000 psi modulus target. Of the constructions described above, those of laminates 3 and 4 were the most effective in promoting the flexural modulus and flexural strength.

Example 2

Chopped glass mats (50 wt-%) were prepared from the polyamide acid, epoxy cresol novolac, and a pre-reacted polyamide acid/epoxy blend. The pre-reacted blend was synthesized by combining 75 wt-% of the polyamide acid (vacuum dried greater>2 hours at 90° C.) with 245 wt-% Epon 828 diglycidyl ether of bisphenol A and 0.5 wt-% 2-heptadecylimidazole catalyst (Pacific Anchor, Los Angeles, Calif.) This catalyst was chosen because of its known latency at temperatures of less than 250° F. The mixture then was blended in a mixing bowl at 250° F. and 80 rpm for 5-10 minutes. During the course of mixing, the torque was observed to rise substantially, resulting in an increase in temperature to about 300° F. The material was removed from the mixing bowl as a dry powder.

The mats were pressed simultaneously at 1,000 psi and 290° C. for 30 minutes. The formualtions evaluated and results obtained are set forth below.

TABLE 2

|  | Laminate No. (wt- %) | | | |
|---|---|---|---|---|
|  | 1 | 2 | 3 | 4 |
| Mat Composition: | | | | |
| D5001 Polyamide Acid | 50 | — | 40 | — |
| Precompounded Polyamic Acid/Epoxy | — | 50 | — | 40 |
| ECN 1299 Novolac Epoxy | — | — | 10 | 10 |
| 2811 Glass fibers | 50 | 50 | 50 | 50 |
| Mat Consolidation: | Poor | Fair | Poor | Good |
| Lower phase transition °C. | — | 107.1 | 104.6 | 135.8 |
| Upper phase transition, °C. | 213.2 | 156.9 | 188.9 | 171.0 |
| Flexural Properties (ASTM D790) | | | | |
| Flexual Modulus, MMpsi | | | | |
| Length | — | 2.30 | — | 2.22 |
| Cross | — | 2.12 | — | 2.13 |
| Flexural Strength. Mpsi | | | | |
| Length | — | 26.8 | — | 37.3 |
| Cross | — | 25.9 | — | 31.8 |

Of the mats evaluated, those formulated with the pre-reacted polyamide acid/epoxy blend resulted in the best consolidation, thus providing processing advantages. Comparison of mechanical properties of laminates 2 and 4 indicated that further addition of the epoxy novolac promoted a higher $T_g$ and flexural strength advantages over the pre-compounded polyamide acid/epoxy blend. Laminates 1 and 3 were not sufficiently consolidated to get meaningful mechanical property testing.

Example 3

The formulation below was compounded by preblending the ingredients listed below at 250° at 80 rpm as described in Example 2, mats formed in accordance with Example 1, and evaluated with results recorded also set forth below.

TABLE 3

|  | Laminate No. (wt- %) | |
|---|---|---|
|  | 1 | 2 |
| Mat Composition: | | |
| D5001 Polyamide Acid | | |
| Undried | 30 | — |
| Vacuum Dried* | — | 30 |
| Epon 828 Epoxy | 9.8 | 9.8 |
| 2-Heptadecylimazole | 0.2 | 0.2 |
| ECN 1299 Novolac | 10.0 | 10.0 |
| 2811 Glass Fibers | 50 | 50 |
| Properties: | | |
| Dynamic Mechanical Analysis (DMA), °C. | | |
| E" Peak | 86.8 | 183.1** |
| Tan Delta Peak | 97.8 | 195.2 |
| Flexural Strength. Mpsi | | |
| Length | 14.5 | 37.6 |
| Cross | 14.0 | 31.1 |

TABLE 3-continued

|  | Laminate No. (wt- %) | |
|---|---|---|
|  | 1 | 2 |
| Flexural Modulus, MMpsi | | |
| Length | 1.88 | 2.21 |
| Cross | 1.50 | 2.20 |
| Ash Content, wt- % | 51 | 48 |
| Flammability | NT | V-1 |

*Vacuum dried >2 hours at 90° C.
**Only one transition occured.

The foregoing data indicates that predrying the polyamide acid promotes the development of the full mechanical properties of the final mat and promotes the "single phase" behavior of the polyamide acid/epoxy blend.

The data in the examples demonstrate the advantage of polyamide acid/epoxy pre-blends in promoting the processability of greater than 50% glass content chopped glass mats, in promoting flexural modulus and strength with the use of a multi-functional epoxy.

It should be noted that in dynamic mechanical analysis (DMA) testing of woven glass cloth laminates made with the various resin compositions evaluated in the examples, the melt point of the polyamide acid intermediate (278° C. by DSC) had to be exceeded to melt out the resin blend and consolidate the laminate. The formulation containing the polyamide acid/epoxy physical blend was observed to remain consolidated, whereas the polyamide acid alone lofted prior to cooling. The polyamide acid/epoxy blends also showed improved glass wet-out compared to the polyamide acid alone. DMA testing of these laminates indicated that a mixture of the pre-reacted polyamide acid/epoxy blend and the novolac epoxy resin resulted in a single glass transition (approximately 173° C.) and retained the highest stiffness (E' value) at 260° C. The significance of these results indicate that the combination of both the pre-compounded polyamide acid/epoxy blend and the epoxy novolac resulted in the most effective compatibilization and the highest cross-link density with little decrease in $T_g$ compared to the pre-compounded polyamide acid/epoxy alone and the combination of the polyamide acid and the novolac epoxy.

I claim:

1. A method for making a chopped fiber-reinforced composite which comprises:
   (a) dispersing a polyamide acid/epoxy blend and greater than 50 wt-% chopped fiber in an aerated surfactant foam;
   (b) depositing said foam on the foraminous layer and collapsing said foam to form a web; and
   (c) consolidating said web at a temperature of greater than 280° C. and a pressure greater than about 500 psi.

2. The method of claim 1 wherein said polyamic acid and said epoxy are a physical blend.

3. The method of claim 1 wherein said polyamide acid and said epoxy are prereacted.

4. The method of claim 1 wherein one or more of said polyamide acid or said epoxy are flame retardant.

5. The method of claim 4 wherein flame retardancy is provided by bromine groups.

6. The method of claim 1 wherein said fiber is one or more of glass, organic, or ceramic.

7. The method of claim 6 wherein said fiber is glass.

8. The method of claim 1 wherein said fiber ranges in length between about 0.125 and 0.75 inches.

* * * * *